United States Patent
Wahl et al.

[11] Patent Number: 5,593,204
[45] Date of Patent: Jan. 14, 1997

[54] GUIDE ROCKER (OR CRANK) FOR A SLIDING COVER OF A SUN ROOF FOR A MOTOR VEHICLE

[75] Inventors: Peter Wahl, Kreuzwertheim; Rudolf Ackermann, Offenbach, both of Germany

[73] Assignee: Peter Wahl GmbH & Co., Kreuzwertheim, Germany

[21] Appl. No.: 393,297

[22] Filed: Feb. 23, 1995

[30] Foreign Application Priority Data

Feb. 23, 1994 [DE] Germany .................. 44 05 742.3

[51] Int. Cl.⁶ .................................................. B60J 7/057
[52] U.S. Cl. .................. 296/223; 74/579 R; 74/104; 384/42; 403/61
[58] Field of Search ........................ 296/216, 221, 296/223; 74/579 R, 104; 384/42; 403/61

[56] References Cited

U.S. PATENT DOCUMENTS

| | | | |
|---|---|---|---|
| 2,911,837 | 11/1959 | Gannett et al. | 74/104 X |
| 3,286,547 | 11/1966 | Ulderup | 74/579 |
| 3,826,155 | 7/1974 | Muller | 74/579 R X |
| 3,985,050 | 10/1976 | Lurig | 81/91 R |
| 4,971,386 | 11/1990 | Bohm et al. | 296/213 |
| 5,169,206 | 12/1992 | Omoto et al. | 296/223 X |

FOREIGN PATENT DOCUMENTS

| | | | |
|---|---|---|---|
| 110529 | 6/1984 | Japan | 384/42 |
| 188230 | 10/1966 | U.S.S.R. | 384/42 |

*Primary Examiner*—Dennis H. Pedder
*Attorney, Agent, or Firm*—Anderson Kill & Olick P.C.

[57] ABSTRACT

A guide rocker (5) for actuating and for controlling displacement of a slide cover of a sun roof for motor vehicle, which is characterized by being formed as a laminar, usable on both side, form-stable sandwich structure of several plates of different materials. At least one reinforcing plate (16), formed of a punched-out sheet metal, tightly abuts one side surface of a plastic rocker body (15) having a guide slot (11) for receiving a guide pin (10) secured in the rear slide block (9) of the sliding cover (1). The reinforcing plate has a slot (17), which corresponds to the guide slot (11) but has a larger slot width and in which is form-locking received an edge projection that surrounds the guide slot (11), projects outwardly from the rocker body (15), and is formed as one piece therewith.

7 Claims, 3 Drawing Sheets

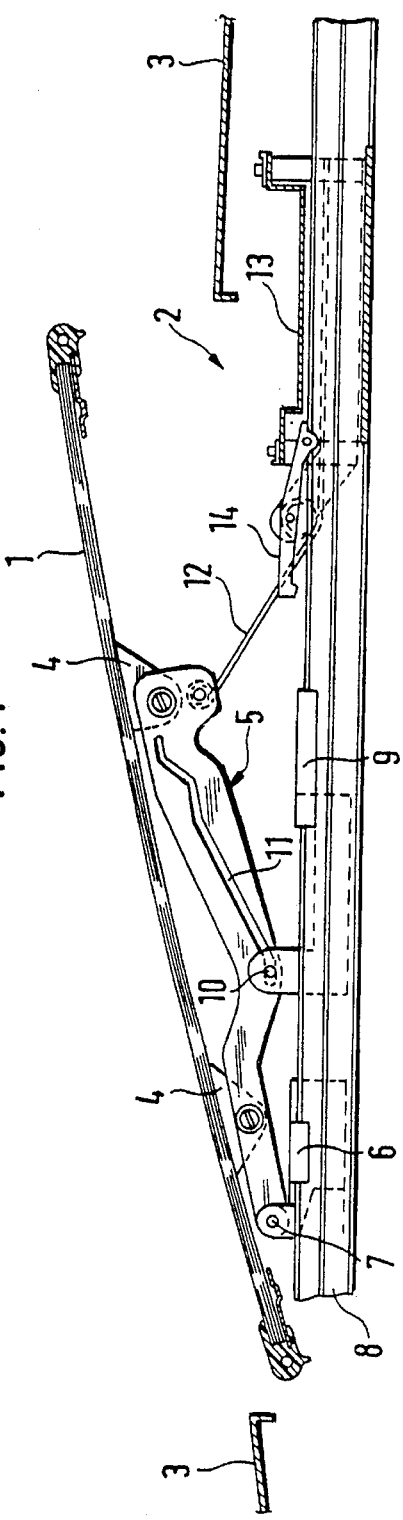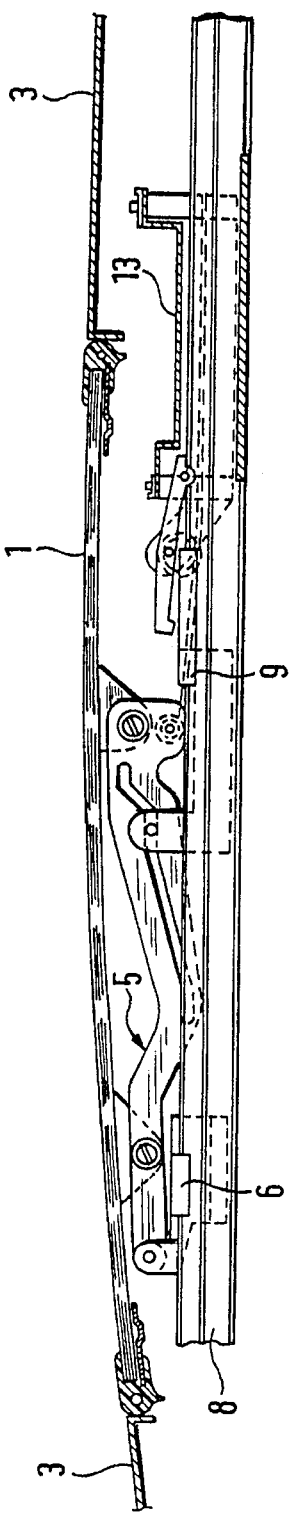

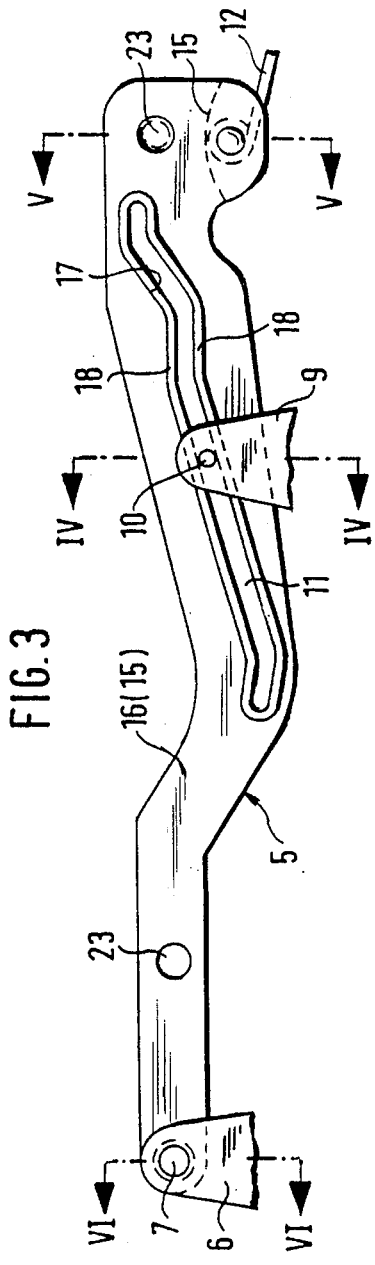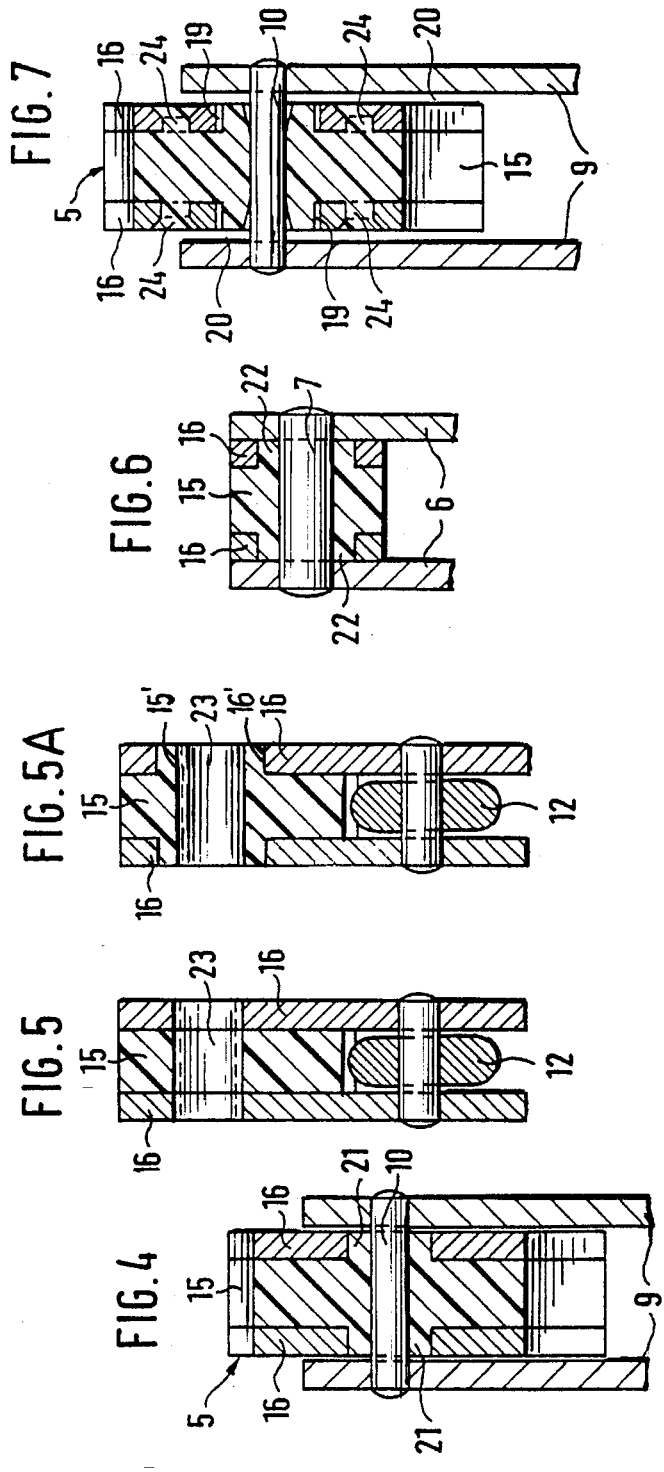

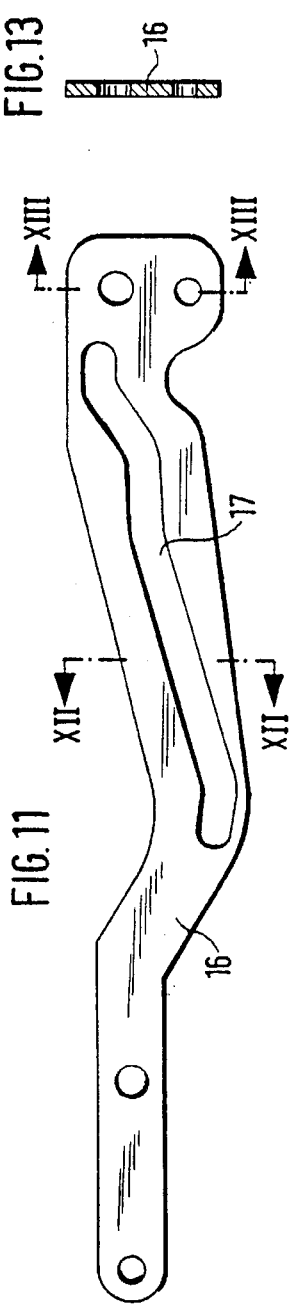
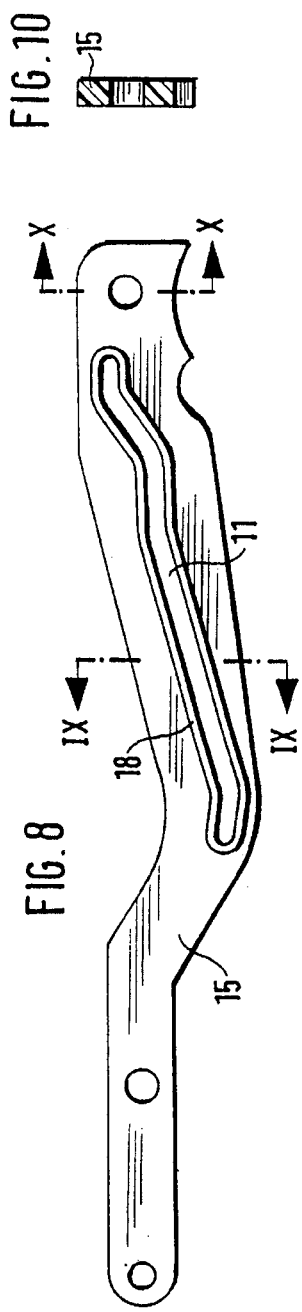
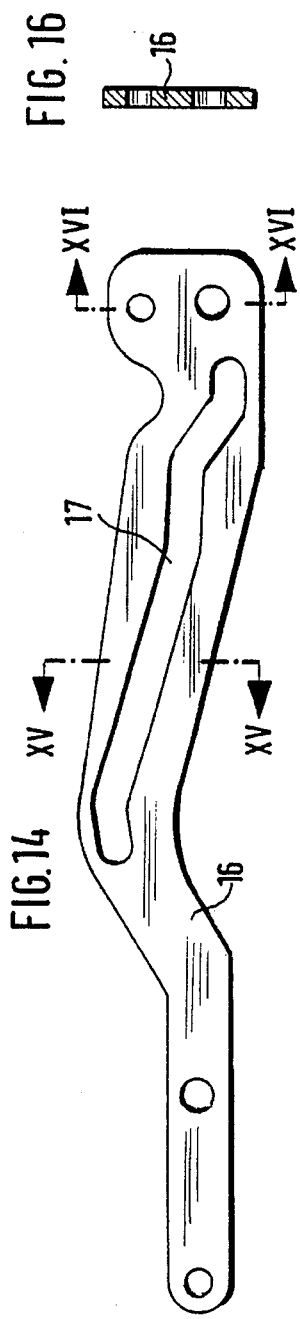

GUIDE ROCKER (OR CRANK) FOR A SLIDING COVER OF A SUN ROOF FOR A MOTOR VEHICLE

BACKGROUND OF THE INVENTION

The invention relates to a guide crank or rocker for connection to a side edge region of sliding cover of a sun roof for a motor vehicle for displacing the slide cover relative to the roof opening. Under the "sun roof" should here be understood all roof constructions and also simple, front, hinge-pivotable ventilation flaps, the roof opening cover of which is displaced by a rocker secured to the cover for effecting displacement. In a known sunroof (DE 16 05 960 B2) with guide rockers of the given type, the rocker body if formed as a flat bar of a wear-resistant material, e.g., poly-$\epsilon$-Caprolaktam. The displacement-controlling slots extend in the base bodies longitudinally and, in accordance with the desired characteristics of the cover displacement, are formed of a plurality of slot sections extending in different directions. Because via the guide pins, which are engaged in the slots, increased forces can be transmitted to the rocker bodies, they, for reasons of strength, should have correspondingly increased dimensions, in particular if the slots extends through the entire thickness of the rocker bodies and/or, because of the desired smaller height of the rocker bodies and the sunroof, they should extend immediately adjacent to the outer edges of the rocker bodies.

In order to reduce the width of rocker bodies which, for reasons of strength and other requirements, are made relatively thick, it was proposed (G 91 16 421.4) to form the rocker body of a sheet metal, with only the guide paths of the guide slots being formed of a plastic material. Advantageously, in this case, the plastic material is sprayed onto the guide slots, which have correspondingly greater dimensions in the sheet metal, to form guide path linings. Alternatively, it was proposed to form the plastic guide path of the rocker slot as mold parts and mount them in the region of the rocker slot on the rocker. When the guide path is sprayed on the guide slot in the sheet metal as a plastic lining, a different spraying device would be required for manufacturing of the left and right guide rockers. Further, additional manual inlay processes are required. Different spraying devices are also required when the plastic guide paths are produced as separate mold parts for later mounting on rockers. Finally, the guide rockers of a sheet material, because of folding and the attachment of connecting elements only on one side, would be formed differently for use as right and left rockers.

The object of the invention is to so form a guide rocker that it would have a greater dimensional stability, at reduced height and width, under all loads, which occur under working conditions of the sunroof, can be economically manufactured, and would be used as both right and left guide rocker, without any additional measures.

SUMMARY OF THE INVENTION

The object of the invention is achieved by providing at least one reinforcing plate which is arranged on a side surface of the rocker body and has a slot, corresponding to the guide slot of the rocker body, and which projects outwardly from the rocker body, and is formed as one-piece therewith.

According to the inventive concept, the guide rocker is formed as a sandwich-like packet of at least one reinforcing plate and a plastic rocker body. Due to this arrangement, the guide rocker has an increased load-bearing capability despite smaller height and width dimension which become possible, wherein the at least one reinforcing plate provides that even when narrow portions of material separates the guide slot from the outer edges of the rocker body, the guide slot, even with an increased slot width, cannot be bent by forces applied by the guide pin. Because both the rocker body and the reinforcing plate are formed as plate-like flat elements, the guide rocker can be produced economically and can be used as both a right rocker and a left rocker.

Advantageously, the guide rocker is formed with two identical reinforcing plates arranged on opposite sides of the rocker body. Due to providing of the reinforcing plates, which are punched out of metal sheet, on both sides of the rocker body, the three-layer sandwich-like packet has a high strength, and the thickness of the plastic rocker body, which is arranged in the middle of the packet, can be made relatively smaller, unless it is done at the expense of the guide path width of the guide slot, by adding the width of the edge projections to the guide slot width. The lateral guide path portions of the edge projections can be used for providing guidance in their entirety, with the edge projection being supported outside on the abutting them slot walls of the slots in the reinforcing plates. At the same time, the narrow engagement of the edge projections of the rocker body with the slots in the reinforcing plates insures good centering of the reinforcing plates on the rocker body. Thereby, advantageously, clamping of the edge projections in the slots is provided.

The concept of the engagement of the projections of the plastic rocker body in the corresponding recesses of the reinforcing plates is also applicable, to connection and support openings of the guide rocker. Thereby, the clamping of three layers of the guide rocker, formed of different materials, and the centering of them relative to each other are further improved.

The formation of the annular projections and the openings in the guide rocker can be effected analogous to the formation of edge projections and the guide paths on the guide slots.

It can be expedient to so recess the plastic rocker body in support position that the support location in formed exclusively by the portions of the reinforcing plate(s) extending beyond the rocker body.

To compensate for alignment errors between the guide paths of the guide slots and the guide pin, the guide paths can be made advantageously convex.

Centering pins provided on the rocker body for; centering of the reinforcing plates on the rocker body, are simultaneously used for securing of the reinforcing plates on the central body, e.g., by thermal rivet-like deformation of the pins in respective openings in the reinforcing plates.

The rocker body and the reinforcing plates can be attached to each other side-by-side, along the entire side surfaces thereof to form an integral sandwich plate, e.g., by ultrasound welding, gluing or riveting.

For manufacturing the rocker body and its projections, formed as one piece therewith, plastic materials, are particularly suitable.

Further details of the invention will be explained in more detail below with reference to the drawings showing a preferred embodiment of a guide rocker. The drawing show:

FIG. 1 a longitudinal cross-sectional view of a sun roof with the sliding cover pivoted upward by the guide rocker;

FIG. 2 a longitudinal cross-sectional view according to FIG. 1 but with a pivoted into the roof plane, i.e., closed, sliding cover;

FIG. 3 a side view of a guide rocker with attached, broken-off operational element;

FIG. 4 cross-sectional view along line IV—IV in FIG. 3;

FIG. 5 cross-sectional view along line V—V in FIG. 3;

FIG. 5A a view similar to that of FIG. 5 and showing a modified embodiment;

FIG. 6 cross-sectional view along line VI—VI in FIG. 3;

FIG. 7 a view similar to that of FIG. 4 and showing a modified embodiment;

FIG. 8 a side view of a plastic rocker body;

FIG. 9 a cross-sectional view along line IX—IX in FIG. 8;

FIG. 10 a cross-sectional view along line X—X in FIG. 8;

FIG. 11 a side view of a reinforcing plate;

FIG. 12 a cross-sectional view along line XII—XII in FIG. 11;

FIG. 13 a cross-sectional view along line XIII—XIII in FIG. 11;

FIG. 14 a mirror-inverterd view of that shown in FIG. 11;

FIG. 14 a mirror-inverted view of that shown in FIG. 11 of another reinforcing plate (absent form the drawings-Translator's Remarks);

FIG. 15 a cross-sectional view along line XV—XV in FIG. 14, a mirror-inverted view of that shown in FIG. 12; and FIG. 16 a cross-sectional view along line XVI—XVI in FIG. 14, a mirror-inverted view of that shown in FIG. 13.

A sun roof shown in FIGS. 1 and 2 is equipped, in the shown example, with a glass sliding cover. Obviously, the sliding cover can be formed of sheet metal. In both figures, the sliding cover is arranged within a roof opening 2 provided in the roof panel 3 of a motor vehicle. In a conventional manner, the sliding cover 1 is pushed, from the closed position shown in FIG. 2 after lowering its rear edge, under the rear region of the roof panel 3.

Two spaced supporting suspension clips 4, which carry an elongate guide rocker 5, are releasably secured on both sides (of which only one side is shown) of the sliding cover 1, in the example shown, with screws. The guide rocker 5 extends beyond the front suspension clip 4 and is pivotally supported with a support pin 7 on a sliding block 6. On the opposite side of the roof opening 2, this arrangement is executed in a mirror-inverted manner, so that both support pins 7 lie on a common horizontal axis extending transverse to a displacement direction. For simplicity sake, below, only the arrangement, which is shown in FIGS. 1 and 2 and which is a mirror-inverted image of the opposite arrangement, will be described.

The front slide block 6 is displaceable along a guide rail 8 secured at a side of the roof opening 2. A rear guide block 9 is likewise displaceable along the guide rail 8 at a variable distance from the front slide block 6, dependent on a pivotal position of the sliding cover 1. A guide pin 10, displaceable in a guide slot 11 provided in the guide rocker 5, is secured to the slide block 9. The guide slot 11 is formed of a plurality of guide slot portions merging into each other and which, in cooperation with the guide pin 10 and a position of the rear slide block 9 relative to the slide block 6, control the displacement of the sliding cover 1.

To this end, a drive element, which displaces the rear slide block along the guide rail 8 and which, e.g., can be in the form of a pressure-resistant thread-driven cable (not shown), engages the rear slide block.

A spring arm 12, which is coupled to the rear end of the guide rocker 5, provides a connection to a water collecting device 13, which is likewise displaceable on the guide rail 8 and which is located, when the sliding cover is in its pivoted-out position (FIG. 1) and its closed position (FIG. 2), beneath the rear edge of the roof opening for collecting incoming water and removing it sidewise. A locking device 14, which is connected with the water collecting device 13 or with the spring arm 12, prevents, in cooperation with the rear slide block 9, the sliding cover 1 from displacing along the guide rail 8 when the sliding cover pivots out in its position shown in FIG. 1 and pivots in into its position shown in FIG. 2. The above-described arrangement and its functions are conventional for sun roofs, so that a more detail explanation here would be superfluous. Below, the structure of the guide rocker 5 according to the invention will be explained in detail, with reference to FIGS. 3–16.

The guide rocker 5 is formed, in a sandwich-like manner, of a rocker body 15 of a wear-and compression-resistant thermoplastic material and two side identical reinforcing plates 16, with the rocker body 15 and the two reinforcing plates 16 abutting each other side-by-side. The reinforcing plates 16 have a slot 17, corresponding to the guide slot 11 in the rocker body 15 but having a larger width, as best shown in FIGS. 8, 11 and 14. The width of the slot 17 is so selected that edge projections 18, which, surrounds the guide slot 11 of the rocker body 15, project outwardly from the rocker body 15, and are formed as one-piece with the rocker body 15, are form-lockingly received. The end surfaces of the edge projections 18 are located in the plane of the outer surfaces of the reinforcing plates 16, as it is clearly shown in FIGS. 4 and 7. Thereby, the outer surfaces of the guide rocker 5 are flat. As it especially clearly shown in FIG. 9, the inner surfaces (without a reference numeral) of the edge projections 18 coincides with the guide paths of the guide slot, so that the guide paths extend from the edge projections and, practically, have a width twice of that of the reinforcing plates 16.

The outer dimensions of the edge projections 18 can be so adapted to the dimensions of the slots 17 that they clampingly receive the edge projections 18, as the clearance-free seating of the parts in FIG. 4 clearly shows. Generally, the width of the slots 17 with regard to the outer surfaces of the edge projections, which face the slot walls, can be so selected, that clearances 19 remain between the edge projections and facing them slot surfaces of the slots 17. This modification is shown in FIG. 7. FIG. 7 also shows that the guide paths of the guide slot can be slightly convexed in a direction transverse to the slot length, whereby a tolerance compensation between the side cheeks of the rear slide block 9 and the guide pin 10, which connects them with each other, on one hand, and the guide rocker 5, on the other hand, becomes, due to the relative rocking motion, possible. To this end, the total width of the guide rocker 5 is smaller then the distance between the cheeks of the rear slide block 9 so that on both sides of the guide rocker 5 clearances 20 remain.

The openings for pivoting the sliding cover with the guide pin 10 and the openings for receiving the support pin 7 are formed in both the rocker body 15 and the reinforcing plates 16 as, e.g., is shown in FIGS. 4 and 6. At that, the diameter of the openings in the reinforcing plates 16 are respectively bigger then the diameter of the openings in the rocker body 15, which are coaxial therewith, for form-lockingly receiving the annular projections 21 and 22. The annular projections 21 and 22 concentrically surrounds the respective associated openings in the rocker body 15, are formed as one-piece with the rocker body 15, and projects therefrom outwardly. The outer end surfaces of the annular projections 21 and 22, like those of the edge projections 18, are located in the plane of the outer surfaces of the reinforcing plates 16, so that the guide rocker, in this case also, has flat outer surfaces. The annular projections 21 and 22 insure that respective diameters of the respective openings for receiving the guide pin 10 and the support pin 7 remain unchanged.

If needed, in the manner described above, the thread openings 23 for securing the guide rocker 5 to the sliding cover 1 can also be provided with annular projections 15' that would engage in respective openings 16' of the reinforcing plates 16. This modification is shown in FIG. 5A of the drawings. FIG. 5 shows, by illustrating the rear opening 23, that the opening diameter is the same in both, the rocker body 15 and the reinforcing plates 16.

FIGS. 3 and 5 show, by way of illustration of the connection of the spring arm 12 to the guide rocker 5, that the reinforcing plates 16 can extend beyond the outer profile of the rocker body 15 in support areas, so that the connecting parts, such as the spring arm 12, are arranged between the reinforcing plates.

The rocker body 15 can be provided with projecting centering pins 24, formed integrally therewith and engaging in corresponding centering holes of the reinforcing plates 16. This modification is shown in FIG. 7. FIG. 7 also shows that the centering holes are formed as sunk holes, whereby the centering pins 24 can be secured in the centering holes by hot forming in a manner that thermo-riveted joints are formed.

The rocker body 15 can be produced from the selected thermoplastic material by injection molding. During the injection molding process, the edge projections 18, the annular projections 21 and 22 and, if needed, the centering pins 24 are formed.

The reinforcing plates 16 and the rocker body 15 can be secured to each other side-by-side so that they abut each other along their entire surfaces. To this end, ultrasonic welding can be used; however, glue connection, with the use of a suitable glue, is also possible, and it provides a sandwich plate with a satisfactory load-bearing capability. The guide rocker 5, connectable to both sides of the sliding cover 1 are identical, so that only one type of the guide rocker need be produced, stored and assembled. For producing sandwich plates, the reinforcing plates can be connected with the rocker body with rivets which pass through all parts.

We claim:

1. A guide rocker for being connected to a side edge region of a sliding cover of a roof opening of a sun roof of a motor vehicle for displacing the sliding cover relative to the roof opening, the guide rocker comprising:

a rocker body formed as a flat bar of a wear-resistant plastic material and having a guide slot for receiving a guide pin connected to and displaceable with a rear slide block for displacing the guide rocker and thereby the sliding cover, the rocker body further having edge projections formed on opposite side surfaces of the rocker body, surrounding the guide slot and projecting outwardly from the opposite side surfaces of the rocker body; and two reinforcing plates which are formed as punched metal sheets, which are arranged on the opposite side surfaces of the rocker body, respectively, tightly abutting, along their entire surfaces, respective opposite side surfaces for the rocker body, and each of which has a slot having a width larger than a width of the guide slot for form-lockingly receiving a respective edge projection, wherein each edge projection has an end surface, which is aligned with an outer surface of a respective reinforcing plate, and an inner surface which extends transverse to the end surface and is aligned with a guide path of the guide slot so that the guide slot has an increased width.

2. A guide rocker as set forth in claim 1, wherein the slot formed in the reinforcing plate clampingly receives the respective edge projection.

3. A guide rocker as set forth in claim 1, wherein the rocker body and the reinforcing plates have coaxial first and second openings, respectively, for securing the guide rocker on the sliding cover, wherein the rocker body has annular projections formed integrally therewith and concentrically surrounding the first openings and projecting outwardly of the rocker body, and wherein the second openings formed in the reinforcing plates have a diameter which is larger than a diameter of the first opening and a size of which is selected so that the annular projections are form-lockingly received in the second openings.

4. A guide rocker as set forth in claim 3, wherein the annular projections have end surfaces which are aligned with the outer surfaces of the respective reinforcing plates.

5. A guide rocker as set forth in claim 1, wherein the guide slot defines guide paths which are convex in a direction transverse to a slot length.

6. A guide rocker as set forth in claim 1, wherein the rocker body has a centering pin formed integrally therein and projecting outwardly therefrom, and wherein the reinforcing plates have centering holes for receiving the centering pin.

7. A guide rocker as set forth in claim 1, wherein the rocker body is formed of a wear and compression resistant thermoplastic material.

\* \* \* \* \*